(United States Patent — Haas, Sr. et al. — Patent Number: 4,567,049 — Date of Patent: Jan. 28, 1986)

PROCESS AND APPARATUS FOR PRODUCING FILLED WAFER BLOCKS

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 682,470

[22] Filed: Dec. 17, 1984

[30] Foreign Application Priority Data

Dec. 21, 1983 [AT] Austria ............... 4475/83

[51] Int. Cl.$^4$ .................. A21D 13/00; A23G 3/00
[52] U.S. Cl. .................. 426/275; 99/450.4; 99/450.7; 426/274; 426/94; 426/103
[58] Field of Search ............ 426/274, 275, 94, 103, 426/95, 391, 283, 302, 496, 572, 502, 808; 99/450.1–450.7, 443 C, 644

[56] References Cited

U.S. PATENT DOCUMENTS 4,246,290 1/1981 Haas, Sr. et al. ............ 99/450.4 X
4,391,832 7/1983 Haas, Sr. et al. ............ 99/450.4 X Primary Examiner—Timothy F. Simone
Attorney, Agent, or Firm—Kurt Kelman

[57] ABSTRACT

In a process in which cover sheets and/or coated wafer sheets are joined to form filled wafer blocks, each coated wafer sheet and, if desired, each cover sheet is moved in a stacking location from a lower position to an overlying upper position, the coated upper surface of each coated wafer sheet is joined to the underside of the cover sheet which is in the upper position and which, if desired, has previously been raised to the upper position, or to the underside of the coated wafer sheet which has previously been raised to the upper position, and each complete wafer block consisting of at least two sheets is moved from said upper position out of said stacking location. To increase the production rate, it is proposed that the successive coated wafer sheets for each wafer block or successive coated wafer sheets and cover sheets disposed between successive coated wafer sheets are successively and continuously fed one by one to the lower position in the stacking location, and at least part of the movement of each of said sheets to said lower position is performed while the next preceding sheet is being raised. It is also proposed to carry out the process by means of two helical conveyors, which have parallel axes of rotation, which are inclined from a normal on the plane of conveyance of the wafer sheet feeder and each of which has a lower convolution, an upper convolution, and an inclined step joining said upper and lower convolutions.

20 Claims, 2 Drawing Figures

U.S. Patent     Jan. 28, 1986     4,567,049
FIG. 1
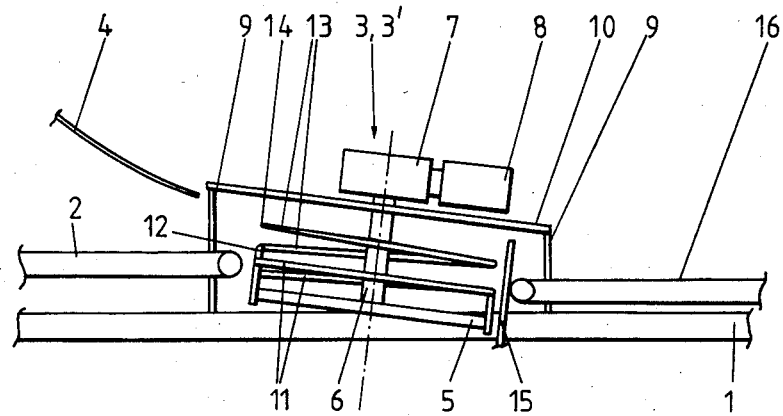
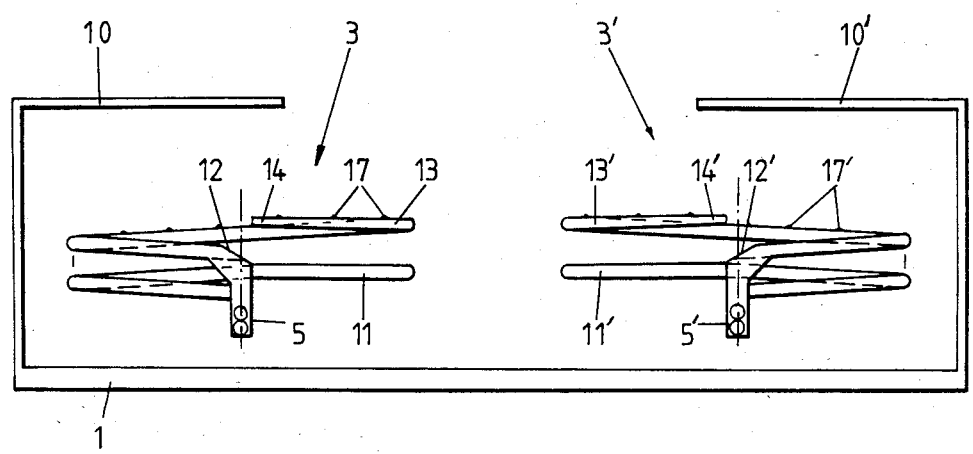
FIG. 2

PROCESS AND APPARATUS FOR PRODUCING FILLED WAFER BLOCKS

BACKGROUND OF THE INVENTION

1. Field of the Invention

This invention relates to the production of filled wafer blocks in a process in which cover sheets, such as uncoated wafer sheets, and/or wafer sheets coated on their upper surface with a spreadable composition, such as a cream, are joined, wherein the top of each coated wafer sheet is contacted with the underside of the cover sheet or of another coated wafer sheet.

2. Description of the Prior Art

In the industrial production of filled wafer sheets it is known to insert successive coated wafer blocks in a lower position into two non-moving helical conveyors, which are rotatable in opposite senses about parallel axes, then to move said helical conveyors so that they raise the coated wafer sheet until it has been joined to the underside of a cover sheet or a coated wafer sheet which is in an upper position, whereafter the helical conveyors are arrested and the next coated wafer sheet is inserted in the lower position into the helical conveyors while they are not moving. When the helical conveyors are then started again, the wafer sheet in the lower position is raised and joined to the underside of the preceding coated wafer sheet, and the helical conveyors are then arrested again.

During the rotation of the helical conveyors, each coated wafer sheet which is being raised from the lower position to the upper position and the partial wafer block which is in the upper position are urged by the helical conveyors against a stop. When coated wafer sheets in the number required for the desired wafer block have been joined to the cover sheet, the stop is lowered and the rotation of the helical conveyors is resumed so that the complete wafer block is removed from the upper position. The stop is subsequently raised to its initial position. The formation of the next wafer block is not initiated until the stop has returned to its initial position and the helical conveyors have been arrested after the wafer block has been removed.

That known process of producing wafer blocks restricts the production rate.

SUMMARY OF THE INVENTION

It is an object of the invention to permit the production of wafer blocks at a higher rate.

For this purpose, the invention proposes a process of producing wafer blocks in which cover sheets, such as uncoated wafer sheets, and/or wafer sheets coated on their upper surface with a spreadable composition, such as a cream, are joined, wherein each coated wafer sheet and, if desired, each cover sheet is moved in a stacking location from a lower position to an overlying upper position, the coated upper surface of each coated wafer sheet is joined to the underside of the cover sheet which is in the upper position and which, if desired, has previously been raised to the upper position, or to the underside of the coated wafer sheet which has previously been raised to the upper position, and each complete wafer block consisting of at least two sheets is moved from the upper position out of the stacking location. Successive coated wafer sheets for each wafer block or successive coated wafer sheets and cover sheets disposed between successive coated wafer sheets are successively and continuously fed one by one to the lower position in the stacking location, and at least part of the movement of each sheet to said lower position is performed while the next preceding sheet is being raised. Because the individual sheets are no longer fed intermittently, the process permits a much higher production rate.

In a process in which the cover sheets are directly fed one by one to the upper position independently of the coated wafer sheets, it is proposed in accordance with the invention to feed the cover sheet for each wafer block to the upper position while the coated wafer sheet which is to be joined to the underside of said cover sheet is being fed to the lower position and/or is being raised. That practice permits an overlap in time between the feeding of the cover sheet and of the feeding of the coated wafer sheet to the lower position and permits also a feeding of the cover sheet as the coated wafer sheet is raised so that the production rate can be further increased.

The process in accordance with the invention may also be carried out in such a manner that each complete wafer block in the upper position is discharged from the stacking location while the coated wafer sheet which is to be joined to the underside of the cover sheet of the next succeeding wafer block is being fed to the lower position and/or raised. That practice will eliminate the need for discharging the wafer block in a separate step in the known process. In accordance with the invention, the process steps comprising the discharge of the wafer block, the feeding of the cover sheet for the next succeeding wafer block and the feeding and/or raising of the wafer sheet which is to be joined to the underside of the cover sheet of the next succeeding wafer block may overlap each other in time in such a manner that these process steps can be performed in the time which is required to feed and raise one coated wafer sheet. As a result, the formation of the next succeeding wafer block can begin before the next preceding wafer block has been removed.

In a process in which the cover sheets and the coated wafer sheets are one by one fed to the lower position, it is proposed in accordance with the invention to discharge each complete wafer block from the upper position out of the stacking location while the cover sheet for the next succeeding wafer block is being fed to the lower position and/or raised. In that practice, all sheets for a wafer block can be continuously fed one by one to the lower position and the formation of the next succeeding wafer block can begin before the next preceding wafer block has been removed from the upper position.

For carrying out the process in accordance with the invention in such a manner that the cover sheets are directly fed to the upper position separately from the coated wafer sheets, an apparatus is proposed which comprises a cover sheet feeder and a wafer sheet feeder, which is operable to feed coated wafer sheets one by one to the lower position in the stacking location in a predetermined feeding direction on a predetermined plane of conveyance, two helical conveyors, which are spaced apart transversely to the feeding direction and adapted to rotate in mutually opposite senses about parallel axes of rotation, the cover sheet feeder and the wafer sheet feeder having delivery ends disposed adjacent to both the helical conveyors on one side thereof, a wafer block discharge conveyor having a receiving end disposed adjacent to both helical conveyors on the opposite side thereof, and a stop, which is adapted to be raised and lowered into and out of the path of wafer blocks moving from the upper position on the helical conveyors to the receiving end. Each helical conveyor has a lower convolution, which is preferably adapted to receive coated wafer sheets from the plane of conveyance, and which is joined by an inclined step to an upper convolution, which is preferably adapted to receive cover sheets from the cover sheet feeder and to deliver wafer blocks to the wafer block discharge conveyor.

For carrying out the process in accordance with the invention in such a manner that the cover sheets and the coated wafer sheets are fed to the lower position, an apparatus is proposed which comprises a sheet feeder, which is operable to feed sheets for the wafer blocks one by one to the lower position in the stacking location in a predetermined feeding direction on a predetermined plane of conveyance, two helical conveyors, which are spaced apart and adapted to rotate in mutually opposite senses about parallel axes of rotation, the sheet feeder having a delivery end disposed adjacent to both helical conveyors on one side thereof, a wafer block discharge conveyor having a receiving end disposed adjacent to both helical conveyors on the opposite side thereof, and a stop, which is adapted to be raised and lowered into and out of the path of wafer blocks moving from the upper position on the helical conveyors to the receiving end. Each helical conveyor has a lower convolution, which is preferably adapted to receive sheets from the plane of conveyance and which is joined by an inclined step to an upper convolution, which is preferably adapted to deliver wafer blocks to the wafer block discharge conveyor. By means of the inclined steps the helical conveyors can pull each sheet entirely to the lower position and can raise each sheet out of the lower position at such an early time that the next succeeding sheet cannot be inserted too soon into the lower position and cannot impinge on a convolution of a helical conveyor. The step will prevent an insertion of two successive sheets onto the same convolution.

If each helical conveyor comprises only two convolutions, these two convolutions are separated by the step. If each helical conveyor comprises more than two convolutions, the step is provided between the lowermost convolution and the next upper convolution.

For carrying out the process in accordance with the invention, the invention proposes also apparatus comprising a sheet feeder, which is operable to feed sheets for the wafer blocks one by one to the lower position in the stacking location in a predetermined feeding direction on a predetermined plane of conveyance, two helical conveyors, which are spaced apart transversely to the feeding direction and adapted to rotate in mutually opposite senses about parallel axes of rotation, the sheet feeder having a delivery end disposed adjacent to both helical conveyors on one side thereof, a wafer block discharge conveyor having a receiving end disposed adjacent to both helical conveyors on the opposite side thereof, and a stop, which is adapted to be raised and lowered into and out of the path of wafer blocks moving from the upper position on the helical conveyors to the receiving end. The axes of rotation of the helical conveyors define a plane which is inclined in the feeding direction from a normal on the plane of conveyance, and each helical conveyor has a lower convolution, which is preferably adapted to receive sheets from the plane of conveyance and which is joined by an inclined step to an upper convolution, which is preferably adapted to deliver wafer blocks to the wafer block discharge conveyor.

Within the scope of the invention the plane defined by the axes of rotation of the helical conveyors has an inclination of 3 to 45 degrees, preferably of 5 to 15 degrees, from the normal on the plane of conveyance of the sheet feeder.

In accordance with a further feature of the invention the plane of conveyance of the wafer block discharge conveyor is downwardly offset from the plane of conveyance of the sheet feeder.

According to a further feature of the invention, each helical conveyor comprises helical wire flights, which have two consecutive convolutions, offset from each other in the direction of the axis of rotation of the helical conveyor and joined by the inclined step.

BRIEF DESCRIPTION OF THE DRAWING

FIG. 1 is a diagrammatic side elevation showing apparatus in accordance with the invention with helical conveyors having inclined axes.

FIG. 2 is a diagrammatic end elevation showing helical conveyors which have axes of rotation which are normal to the plane of conveyance of the wafer sheet feeder.

DETAILED DESCRIPTION OF THE PREFERRED EMBODIMENTS

The invention will now be described more in detail with reference to the drawings, which show illustrative embodiments of apparatus in accordance with the invention.

With reference to FIG. 1, a frame 1 incorporates a wafer sheet feeder 2, which preferably consists of a belt conveyor and has a delivery end disposed adjacent to two helical conveyors 3, 3' on one side thereof. Helical conveyors 3, 3' are spaced apart transversely to the feeding direction of the wafer sheet feeder 2. A cover sheet feeder 4 is disposed above the wafer sheet feeder 2 and has a delivery end disposed adjacent to both helical conveyors 3', 3 on the same side thereof as wafer sheet feeder 2. The two helical conveyors 3, 3' rotate in mutually opposite senses. Each helical conveyor 3, 3' has helical wire flights, which rise opposite to the sense of rotation of the helical conveyor. The helical wire flights of each helical conveyor are secured by a crosspiece 5 or 5' to one end of a drive shaft 6, which protrudes from an angle drive 7, mounted on the frame 1 and to which a drive motor 8 is flanged. Each angle gear is secured to a mounting plate 10, which is inclined from the plane of conveyance of the wafer sheet feeder 2 and is connected to the frame 1 by posts 9.

Each of the helical flights of the helical conveyors 3, 3' comprises a lower convolution 11 or 11', which is joined by an inclined step 12, 12' to an upper convolution 13 or 13', which has a free end 14, 14' that is disposed above the step 12 or 12' and before the same. The two lower convolutions 11, 11' of the two helical conveyors 3, 3' are adapted to receive coated wafer sheets from the plane of conveyance of the wafer sheet feeder 2. The two upper convolutions 13, 13' of the two helical conveyors 3, 3' are adapted to receive cover sheets from the cover sheet feeder 4. A stop 15, which is adapted to be lowered and extends transversely to the feeding direction, is disposed close to the two helical conveyors 3, 3' on that side thereof which is opposite to the wafer sheet feeder 2 and the cover sheet feeder 4. That stop 15 is succeeded by a wafer block discharge conveyor 16, preferably a belt conveyor, which has a plane of conveyance below the plane of conveyance of the wafer sheet feeder 2 and is adapted to receive wafer blocks from the upper convolutions 13, 13' of the two helical conveyors 3, 3'. The stop 15 is disposed in the path of the wafer blocks moving from the upper convolutions 13, 13' to the wafer block discharge conveyor 16.

FIG. 1 shows only one of the helical conveyors 3, 3', the axes of rotation of which extend in a plane which is inclined in the feeding direction of the wafer sheet feeder 2 from a normal on the plane of conveyance of wafer sheet feeder 2.

FIG. 2 shows the helical flights of two helical conveyors 3, 3' which have axes of rotation which are at right angles to the plane of conveyance of the wafer sheet feeder, which is not shown. The upper convolutions 13, 13' of the two helical conveyors 3, 3' are provided on their upper side with bosses 17, 17' in order to increase the friction.

In order to produce wafer blocks, wafer sheets which are coated on their upper side, preferably with cream, are continuously fed one by one by the wafer sheet feeder 2 to the helical conveyors 3, 3', which are provided at the stacking location. Each wafer sheet is inserted between the two helical conveyors 3, 3' and received by the lower convolutions 11, 11' thereof and is raised by the rotating conveyors 3, 3' as the two steps 12, 12' move under the wafer sheet and pull it into the helical conveyors so that the next succeeding wafer sheet is received on the lower convolutions 11, 11' behind the two steps while the next preceding wafer sheet is raised until it lies on the upper convolutions 13, 13'. As that wafer sheet is raised, its coated upper surface is joined to the underside of a cover sheet or coated wafer sheet which lies already on the upper convolutions 13, 13'. That process step is terminated when the two helical conveyors 3, 3' have been rotated through 180 degrees (from the positions shown). If the thus joined coated wafer sheet was the last (lowermost) sheet of a wafer block, the stop 15 is lowered and the complete wafer block is transferred to the wafer block discharge conveyor 16 as the two helical conveyors 3, 3' rotate through additional 180 degrees. The stop 15 is then raised and thereafter a cover sheet is fed by the cover sheet feeder 4 directly onto the upper convolutions 13, 13' of the two helical conveyors. During the next rotation of the two helical conveyors 3, 3' through 180 degrees, the first (uppermost) coated wafer sheet for the next wafer block is raised by the steps 12, 12' and is joined to the cover sheet from below while the second coated wafer sheet for that wafer block is being received by the lower convolutions 11, 11' in the lower position.

If the wafer sheets fed by the wafer sheet feeder 2 abut at their adjacent end edges, a reliable separation of successive wafer sheets can be ensured if each wafer sheet is pulled in by the two helical conveyors 3, 3' somewhat faster than it is fed by the wafer sheet feeder 2. If the cover sheets are also fed by the wafer sheet feeder rather than by the cover sheet feeder 4, the cover sheet for the next wafer block is supplied to the lower convolutions of the helical conveyors 3, 3' while the last (lowermost) coated wafer sheet of the preceding wafer block is raised to the upper position on the upper convolutions.

The invention permits the operations of the helical conveyors 3, 3' and of the wafer sheet feeder 2 to be synchronized so that the helical conveyors 3, 3' can rotate continuously and can produce more wafer blocks per unit of time.

We claim:

1. A process of producing multi-layered filled wafer blocks consisting each of a plurality of superimposed sheets having an upper surface coated with a spreadable composition and a cover sheet at the top thereof, which comprises
   (a) successively and one by one feeding the cover sheet and the coated sheets of each wafer block to a predetermined lower position in a stacking location,
   (b) successively and one by one raising the sheets from the lower position to a predetermined upper position in the stacking location until the coated sheets are joined to the superimposed sheets to form each wafer block in the upper position, and
   (c) discharging each formed wafer block in the upper position from the stacking location,
   (d) the sheets being fed continuously to the lower position and each sheet being fed into the lower position before a preceding one of the sheets has reached the upper position.

2. The process of claim 1, wherein each formed wafer block is discharged from the stacking location while a respective one of the cover sheets for the following one of the wafer blocks is fed to the lower position in the stacking location.

3. The process of claim 1, wherein each formed wafer block is discharged from the stacking location while a respective one of the cover sheets for a following one of the wafer blocks is raised to the upper position.

4. A process of producing multi-layered filled wafer blocks consisting each of a plurality of superimposed sheets having an upper surface coated with a spreadable composition and a cover sheet at the top thereof, which comprises
   (a) successively and one by one feeding the coated sheets of each wafer block to a predetermined lower position in a stacking location,
   (b) separately and directly feeding the cover sheet for each wafer block to a predetermined upper position above the lower position,
   (c) successively and one by one raising the coated sheets from the lower position to the upper position in the stacking location until the coated sheets are joined to the superimposed sheets to form each wafer block in the upper position, and
   (d) discharging each formed wafer block in the upper position from the stacking location,
   (e) the coated sheets being fed continuously to the lower position and each coated sheet being fed into the lower position before a preceding one of the coated sheets has reached the upper position.

5. The process of claim 4, wherein the cover sheet of each formed wafer block is fed to the upper position before a first one of the coated sheets for the wafer block has reached the upper position in the stacking location.

6. The process of claim 4, wherein each formed wafer block is discharged from the stacking location while a respective one of the cover sheets for a following one of the wafer blocks is fed to the upper position in the stacking location.

7. An apparatus for producing multi-layered filled wafer blocks consisting each of a plurality of superimposed sheets having an upper surface coated with a spreadable composition and a cover sheet at the top thereof, which comprises (a) a stacking station,
(b) sheet-feeding means leading to, and terminating ahead of, the stacking station for successively and one by one feeding a respective one of the cover sheets followed by the coated sheets for each one of the wafer blocks to a predetermined lower position in the stacking station,
(c) a wafer block discharge conveyor for discharging a respective one of the wafer blocks from a predetermined upper position above the lower position in the stacking station,
(d) sheet-raising means in the stacking station between the sheet-feeding means and the wafer block discharge conveyor for successively and one by one raising each sheet fed by the sheet-feeding means from the lower to the upper position until the coated sheets are joined to the superimposed sheets to form each wafer block in the upper position, the sheet-raising means comprising
  (1) two adjacent helical conveyors spaced transversely to the sheet-feeding means and rotatable about parallel axes in opposite senses, each one of the helical conveyors having a lower convolution associated with the lower position and an upper convolution axially spaced from the lower convolution and associated with the upper position, the helical conveyor convolutions being arranged successively and one by one to receive the fed sheets during the rotation of the conveyors, and
  (2) an inclined step connecting the lower and upper convolutions, and
(e) a stop associated with each one of the helical conveyors and adapted to be raised and lowered into and out of a path for each one of the wafer blocks from the upper position to the wafer block discharge conveyor, the stop being so arranged that rotation of the associated helical conveyor successively and one by one raises the sheets along the stop.

8. The apparatus of claim 7, wherein the helical conveyor convolutions are axially spaced helical wire flights having axially spaced ends adjacent each other, the inclined step connecting the adjacent helical wire flight ends.

9. The apparatus of claim 8, further comprising friction-increasing means on an upper surface of the upper helical wire flights.

10. The apparatus of claim 7, wherein helical conveyor convolutions are inclined with respect to a plane of conveyance of the sheet-feeding means, the axes of the conveyors being inclined in the feeding direction from a normal on the conveyance plane.

11. The apparatus of claim 10, wherein the axes are inclined by an angle of 30° to 45°.

12. The apparatus of claim 11, wherein the axes are inclined by an angle of 5° to 15°.

13. The apparatus of claim 7, wherein the wafer block discharge conveyor has a plane of conveyance higher than a plane of conveyance of the sheet-feeding means.

14. An apparatus for producing multi-layered filled wafer blocks consisting each of a plurality of superimposed sheets having an upper surface coated with a spreadable composition and a cover sheet at the top thereof, which comprises (a) a stacking station,
(b) a first sheet-feeding means leading to, and terminating ahead of, the stacking station for successively and one by one feeding a respective one of the coated sheets to a predetermined lower position in the stacking station,
(c) a second sheet-feeding means leading to, and terminating ahead of, the stacking station for successively and one by one feeding a respective one of the cover sheets to a predetermined upper position above the lower position in the stacking station,
(d) a wafer block discharge conveyor for discharging a respective one of the wafer blocks from the upper position,
(e) sheet-raising means in the stacking station between the sheet-feeding means and the wafer block discharge conveyor for successively and one by one raising each coated sheet fed by the first sheet-feeding means from the lower to the upper position until the coated sheets are joined to the superimposed sheets to form each wafer block in the upper position, the sheet-raising means comprising
  (1) two adjacent helical conveyors spaced transversely to the sheet-feeding means and rotatable about parallel axes in opposite senses, each one of the helical conveyors having a lower convolution associated with the lower position and an upper convolution axially spaced from the lower convolution and associated with the upper position, the helical conveyor convolutions being arranged successively and one by one to receive the fed sheets during the rotation of the conveyors, and
  (2) an inclined step connecting the lower and upper convolutions, and
(f) a stop associated with each one of the helical conveyors and adapted to be raised and lowered into and out of a path for each one of the wafer blocks from the upper position to the wafer block discharge conveyor, the stop being so arranged that rotation of the associated helical conveyor successively and one by one raises the sheets along the stop.

15. The apparatus of claim 14, wherein the helical conveyor convolutions are axially spaced helical wire flights having axially spaced ends adjacent each other, the inclined step connecting the adjacent helical wire flight ends.

16. The apparatus of claim 15, further comprising friction-increasing means on an upper surface of the upper helical wire flights.

17. The apparatus of claim 14, wherein helical conveyor convolutions are inclined with respect to a plane of conveyance of the sheet-feeding means, the axes of the conveyors being inclined in the feeding direction from a normal on the conveyance plane.

18. The apparatus of claim 17, wherein the axes are inclined by an angle of 3° to 45°.

19. The apparatus of claim 18, wherein the axes are inclined by an angle of 5° to 15°.

20. The apparatus of claim 14, wherein the wafer block discharge conveyor has a plane of conveyance higher than a plane of conveyance of the sheet-feeding means.

* * * * *